United States Patent
Spruyt et al.

(10) Patent No.: US 6,912,233 B2
(45) Date of Patent: *Jun. 28, 2005

(54) MODULATION/DEMODULATION OF A PILOT CARRIER, AND MEANS TO PERFORM THE MODULATION/DEMODULATION

(75) Inventors: Paul Marie Pierre Spruyt, Heverlee (BE); Frank Octaaf Van der Putten, Hombeek (BE); Peter Paul Frans Reusens, Laarne (BE)

(73) Assignee: Alcatel Alsthom Compagnie Generale d'Electricite, Paris (FR)

( * ) Notice: Subject to any disclaimer, the term of this patent is extended or adjusted under 35 U.S.C. 154(b) by 226 days.

This patent is subject to a terminal disclaimer.

(21) Appl. No.: 10/082,631

(22) Filed: Feb. 22, 2002

(65) Prior Publication Data

US 2002/0118658 A1 Aug. 29, 2002

Related U.S. Application Data

(63) Continuation of application No. 08/844,383, filed on Apr. 18, 1997, now Pat. No. 6,370,156.

(30) Foreign Application Priority Data

Jan. 31, 1997 (EP) .............................................. 97400221

(51) Int. Cl.[7] .................................................. H04J 1/00
(52) U.S. Cl. ...................... 370/482; 370/430; 375/222
(58) Field of Search ................................. 370/430, 468, 370/478, 480–482, 503, 208, 210; 375/220–222, 229

(56) References Cited

U.S. PATENT DOCUMENTS

| 5,103,459 A | 4/1992 | Gilhousen et al. ............. 375/1 |
|---|---|---|
| 5,241,544 A | 8/1993 | Jasper et al. ............. 370/105.3 |
| 5,311,541 A | 5/1994 | Sanderford, Jr. ................ 375/1 |
| 5,400,322 A | 3/1995 | Hunt et al. ..................... 370/19 |
| 5,406,551 A | 4/1995 | Saito et al. ..................... 370/19 |
| 5,414,734 A | 5/1995 | Marchetto et al. ........... 375/267 |
| 5,506,865 A | 4/1996 | Weaver, Jr. ................... 375/205 |
| 5,546,190 A | 8/1996 | Hill et al. .................... 359/158 |
| 5,548,344 A | 8/1996 | Park ........................... 348/726 |
| 5,627,863 A | 5/1997 | Aslanis et al. ............... 375/357 |
| 5,703,873 A | 12/1997 | Ojanpera et al. ............ 370/332 |
| 5,745,839 A | 4/1998 | Leiberman .................... 455/10 |
| 5,748,677 A | 5/1998 | Kumar ......................... 375/285 |

(Continued)

OTHER PUBLICATIONS

"Network and Customer Installation Interfaces–Asymmetric Digital Subscriber Line (ADSL) Metallic Interface"; ANSI Standard on ADSL; TIE1.413–1995; pp. 46 and 58.

"A Multicarrier E1–HDSL Tranceiver System with Coded Modulation"; P. S. Chow et al.; Journal of European Transactions on Telecommunications and Related Technologies (ETT); pp. 257–266.

*Primary Examiner*—John Pezzlo
(74) *Attorney, Agent, or Firm*—Ware, Fressola, Van Der Sluys & Adolphson LLP

(57) ABSTRACT

For synchronization purposes, a transmitter (TX) multiplexes a pilot carrier with carriers whereon data elements (DATA) are modulated, and transmits the pilot carrier together with the modulated carriers to a receiver (RX). The immunity of the pilot carrier for interferers, such as radio amateur signals, is improved by modulating the pilot carrier with a non-constant signal, for instance a random signal, an alternating signal or even scrambled data elements (DATA), before transmission thereof. Since demodulation of the pilot carrier in the receiver (RX) and averaging successive demodulated pilot carriers reduces the effect of the interference induced on the non-constantly modulated pilot carrier, the degradation of the synchronization between transmitter (TX and receiver (RX) is reduced significantly.

9 Claims, 1 Drawing Sheet

U.S. PATENT DOCUMENTS

| | | |
|---|---|---|
| 5,751,761 A | 5/1998 | Gilhousen .................... 375/200 |
| 5,790,514 A | 8/1998 | Marchok et al. ............ 370/208 |
| 5,867,528 A | 2/1999 | Verbueken .................. 375/222 |
| 5,910,970 A | 6/1999 | Lu ............................. 375/377 |
| 5,943,361 A | 8/1999 | Gilhousen et al. .......... 375/200 |
| 5,991,308 A | 11/1999 | Fuhrmann et al. .......... 370/474 |
| 6,055,268 A * | 4/2000 | Timm et al. ................. 375/229 |
| 6,118,758 A | 9/2000 | Marchok et al. ............ 370/210 |

* cited by examiner

MODULATION/DEMODULATION OF A PILOT CARRIER, AND MEANS TO PERFORM THE MODULATION/DEMODULATION

This application is a continuation of a U.S. patent application Ser. No. 08/844,383, filed Apr. 18, 1997, now U.S. Pat. No. 6,370,156 B2.

TECHNICAL FIELD

The present invention relates to a method for transmitting data elements from a transmitter to a receiver, wherein the data elements are modulated on at least one carrier; wherein a pilot carrier is used for synchronisation between the transmitter and the receiver which is multiplexed with the at least one carrier, and wherein the at least one carrier and the pilot carrier are transmitted over a transmission medium interconnecting the transmitter and the receiver.

It is also directed to a transmitter adapted to transmit data elements to a receiver via a transmission medium, the transmitter comprising modulation means to a first input of which the data elements are applied, the modulation means being adapted to modulate the data elements on at least one carrier, and to multiplex the at least one carrier with a pilot carrier used for synchronisation between the transmitter and the receiver; pilot information means, adapted to generate information to identify the pilot carrier, and to apply the information to a second input of the modulation means; and line interface means, coupled between an output of the modulation means and an input of the transmission medium and adapted to condition the at least one carrier and the pilot carrier to be transmitted over the transmission medium.

It is additionally directed to a receiver adapted to receive a signal transmitted thereto by a transmitter via a transmission medium, the receiver comprising: line interface means, coupled to an output of the transmission medium and adapted to condition the signal to be applied to components of the receiver; demodulating means, an input of which is coupled to an output of the line interface means, the demodulating means being adapted to demultiplex in the signal a pilot carrier from at least one carrier whereon data elements are modulated, and to demodulate the data elements from the at least one carrier; and pilot information means, adapted to generate information to identify the pilot carrier, and to apply the information to a second input of the demodulation means.

It is still further directed to a transmission system comprising a transmitter, a receiver and a transmission medium, coupled between an output of the transmitter and an input of the receiver, wherein the transmitter and receiver are of the above described type.

BACKGROUND OF THE INVENTION

Such a method for transmitting data elements, such a transmitter and receiver, and such a transmission system are already known in the art, e.g. from the specifications of the ANSI (*American National Standards Institute, Inc.*) Standard on ADSL, the approved version of which has the reference T1E1.413-1995 and title *"Network and Customer Installation Interfaces, Asymmetric Digital Subscriber Line (ADSL) Metallic Interface"*. Therein, data elements are modulated on a set of carriers. In case of discrete multi tone (DMT) modulation, these carriers have equidistant frequencies. As is indicated in paragraphs 6.9.1.2 and 7.9.1.2 on pages 46 and 58 of the above cited standard, published in 1995, one of the carriers is reserved as a pilot carrier. This pilot carrier is used for synchronisation between transmitter and receiver and is modulated by a constant signal. In a vector plane, wherein the modulation constellation is represented by a collection of points, the pilot carrier is thus represented by a single point. On the transmission medium, e.g. on a telephone line interconnecting the ADSL transmitter and ADSL receiver in the known system, the pilot carrier thus represents a sine or cosine which does not change in phase, amplitude or frequency in time (in case a guard bond or cyclic prefix is added whose length does not contain an integer number of periods of the pilot tone, the pilot tone might be discontinuous at the edges of the DMT symbol).

A well-known source of narrowbanded or single frequency disturbances is a radio amateur or an AM radio station, which broadcasts radio signals at frequencies close to carrier frequencies. Forward error correction techniques, well-known in the art, can reduce the effect of such disturbances on data carried by the affected carriers. An alternative way to protect data against such interferers, proposed by Peter S. Chow et al. in the article *"A multicarrier E1-HDSL Transceiver System with Coded Modulation"* from the authors Peter S. Chow, Noafal Al-Dhahir, John M. Cioffi and John A. C. Bingham published in issue No. 3 May/June 1993 of the Journal of European Transactions on Telecommunications and Related Technologies (ETT), pages 257–266, is bitswapping: bit and energy allocations are updated so that the affected carriers carry less data bits then before. This technique requires an additional communication between transmitter and receiver.

Although data transmitted over the telephone line from the transmitter to the receiver may be protected by one of the above mentioned techniques, the presence of noise or an interferer, for instance a radio amateur signal, with a frequency in the vicinity of the frequency of the pilot carrier, may still cause an offset between the received point representing the pilot carrier in the above defined vector plane and the expected point. If this offset in the vector plane is not sufficiently random, it biases the synchronisation mechanism, resulting in a performance degradation. This is e.g. the case if the instantaneous phase of the interferer is very slowly varying in time with respect to the duration of the DMT symbol or if this interferer is constant.

SUMMARY OF THE INVENTION

It is an object of the present invention to provide a method for transmitting data elements and related equipment of the known type, but wherein the immunity of the pilot carrier from interference is increased significantly, and consequently wherein the degradation of the synchronisation mechanism between transmitter and receiver is reduced.

According to the present invention, this object is achieved by a method for transmitting data elements from a transmitter to a receiver, wherein the data elements are modulated on at least one carrier, a pilot carrier used for synchronisation between the transmitter and the receiver is multiplexed with the at least one carrier; the at least one carrier and the pilot carrier are transmitted over a transmission medium interconnecting the transmitter and the receiver, characterized in that the pilot carrier is modulated with a non-constant signal before it is transmitted.

It is also achieved by a transmitter, adapted to transmit data elements to a receiver via a transmission medium, the transmitter comprising: modulation means to a first input of which the data elements are applied, the modulation means being adapted to modulate the data elements on at least one carrier, and to multiplex the at least one carrier with a pilot carrier used for synchronisation between the transmitter and the receiver; pilot information means, adapted to generate information to identify the pilot carrier, and to apply the information to a second input of the modulation means; and line interface means, coupled between an output of the modulation means and an input of the transmission medium, and adapted to condition the at least one carrier and the pilot carrier to be transmitted over the transmission medium, characterised in that the modulation means is further adapted to modulate the pilot carrier with a non-constant signal.

It is still further achieved by a receiver, adapted to receive a signal transmitted thereto by a transmitter via a transmission medium, the receiver comprising line interface means, coupled to an output of the transmission medium and adapted to condition the signal to be applied to components of the receiver; demodulating means, an input of which is coupled to an output of the line interface means, the demodulating means being adapted to demultiplex in the signal a pilot carrier from at least one carrier whereon data elements are modulated, and to demodulate the data elements from the at least one carrier, and pilot information means, adapted to generate information to identify the pilot carrier, and to apply the information to a second input of the demodulation means, characterised in that the demodulating means further is adapted to demodulate a nonconstant signal from the pilot carrier and to use the demodulated pilot carrier for synchronisation.

It is still further achieved by a transmission system comprising a transmitter, a receiver and a transmission medium, coupled between an output of the transmitter and an input of the receiver, the transmitter comprising: modulation means to a first input of which data elements are applied, the modulation means being adapted to modulate the data elements on at least one carrier, and to multiplex the at least one carrier with a pilot carrier used for synchronisation between the transmitter and the receiver; pilot information means, adapted to generate information to identify the pilot carrier, and to apply the information to a second input of the modulation means; and line interface means, coupled between an output of the modulation means and an input of the transmission medium, and adapted to condition the at least one carrier and the pilot carrier to be transmitted over the transmission medium, and the receiver comprising: line interface means, coupled to an output of the transmission medium and adapted to condition a signal received therefrom to be applied to components of the receiver; demodulating means, an input of which is coupled to an output of the line interface means, the demodulating mean being adapted to demultiplex in the signal the pilot carrier from the at least one carrier, and to demodulate data elements from the at least one carrier; and pilot information means, adapted to generate information to identify the pilot carrier, and to apply the information to a second input of the demodulation means, characterised in that the modulation means is further adapted to modulate the pilot carrier with a non-constant signal; and the demodulating means is adapted to demodulate the non-constant signal from the pilot carrier and to use the demodulated pilot carrier for synchronisation.

In this way, by modulating the pilot carrier with a non-constant signal, the pilot carrier appears on the transmission medium as a sine or cosine with non-constant phase and/or amplitude. Demodulation of such a pilot carrier at the receiver's side, re-generates the unmodulated pilot carrier, i.e. a sine or cosine with non varying phase and/or amplitude from the transmitted modulated pilot carrier. For interference induced on the modulated pilot carrier, this demodulation has an averaging effect as will be explained in more detail later on in the description. The effect of an interferer on different states of the modulation constellation is thus averaged by demodulation. The final effect of an interferer after demodulation is far less than the effect of the interferer on one single state in the modulation constellation scheme as a result of which the transmission system according to the present invention has a significantly increased immunity for narrowband interferers, compared to the above described known system.

It is noted that the implementation of the synchronisation means can be simplified if the constellation points of the pilot carrier are well chosen, e.g. if all points have the same amplitude.

It is further to be noticed that the term "comprising" used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B.

Similarly, it is to be noted that the term "coupled" also used in the claims, should not be interpreted as being limited to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

A remark is also that, in view of the present invention, it is not important whether the frequency of the pilot carrier is a fixed one or not. The pilot carrier may change in frequency whenever the transmitter or receiver concludes that the pilot frequency is laying within a frequency band with too much interference. The transmitter and receiver then have to negotiate a new pilot tone frequency More details about this technique are irrelevant in view of the present invention but it is stressed here that changing the frequency of the pilot tone and modulating the pilot tone with non-constant signals are two techniques which may be applied independently to improve interference immunity of the synchronisation between transmitter and receiver. These techniques may be used complementary or may be applied separately.

In a particular implementation of the present invention, the pilot carrier is modulated as a random or pseudo-random signal.

In this way, by modulating a randomised signal on the pilot carrier, the state of the pilot carrier in the constellation scheme will change randomly so that the demodulation will have a good averaging effect resulting in an increase of the interference immunity.

In another implementation of the present invention, the pilot carrier is modulated with a predefined sequence that ensures sufficient alternations of the states of the pilot carrier.

In this way, if the averaged effect of interference over all visited states in the constellation scheme is zero after demodulation, the best results will be obtained in terms of improvement of the interference immunity. Indeed, when each state has an equal probability and the constellation has a symmetry around zero, the effect of interference will be compensated for completely after demodulation. As an example, the constellation might contain only two points with the same amplitude but with opposite phases. Successive pilots would then have alternate phases.

It is remarked that the proposed technique con be used whether or not the predefined sequence is known at the receiver. If the sequence is unknown, the receiver has to demap the received pilot, i.e. it has to map the received point on a constellation point. The decision is then used to generate the unmodulated pilot.

In yet another implementation of the present invention, the pilot carrier is modulated part of the data elements to be transmitted.

This implementation has the additional advantage that it provides an enlarged bandwidth for transport of data elements. Indeed, in the already cited ADSL system for instance, the pilot carrier may be modulated with an 8 kbit/s datastream by allocating two bits to it. If this additional bandwidth is used for transporting data elements, the aggregate bit rate between transmitter and receiver will be increased with an equivalent amount. It is to be remarked that, to have significant immunity against interferers, the data elements which are modulated on the pilot carrier, hove to be sufficiently random so that the pilot carrier reaches all states in the constellation scheme and a good averaging of the interference is obtained by demodulation. This can be obtained by scrambling.

An additional feature of the present invention is that it may be applied in the field of ADSL and VDSL so that the transmitter and receiver constitute a discrete multitone transceiver according to the Asymmetric Digital Subscriber Line standard T1E1.413.

Indeed, systems wherein data elements are transmitted over copper telephone lines such as ADSL (Asymmetric Digital Subscriber Line), VDSL (Very High Bitrate Digital Subscriber Line) or the like are subjected to interference such as radio amateur signals. It is therefore likely to protect such systems with the technique according to the present invention.

Furthermore, a characteristic feature of the present invention is where the data elements modulated on the pilot carrier are operation channel data elements or overhead control channel data elements such as data elements used for maintenance or indicating a modification of the number of bits modulated on a carrier of the at least one carrier.

As described in the already mentioned ADSL specification, the DMT symbols contain user data and overhead data, e.g. operation channel data or overhead control channel data such as operation and maintenance commands, vendor specific commands, bit swap information, and so on. The embedded operations channel (eoc) and the ADSL overhead control (aoc) channel are described respectively in paragraphs 11.1 13.1 on pages 71 and 112 of the earlier mentioned specification. This information may for instance be modulated on the pilot carrier.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
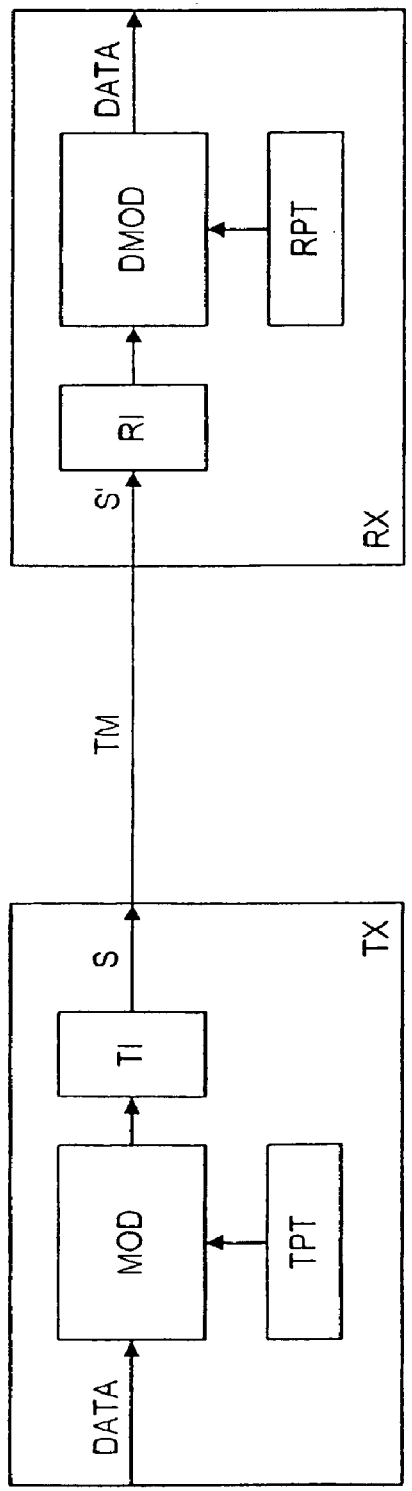
FIG. 1 represents a transmission system including a transmitter TX and a receiver RX according to the present invention.

The transmission system drawn in FIG. 1 includes a first Asymmetric Digital Subscriber Line (ADSL) modem of which only the transmitting part TX 20 is drawn, a second ADSL modem of which only the receiving part RX 30 is drawn, and a copper twisted pair telephone line TM 40 coupling the two ADSL modems. The first ADSL modem may for instance be located in a remote terminal and modulates data DATA 21 to be transmitted over the telephone line TM 40 towards the second ADSL modem which may for instance be located in a central office. Both ADSL modems respect the specifications of the ADSL Standard T1E1.413.

The transmitting part TX 20 of the first ADSL modem contains between a data input DATA 21 and a signal output S 25 the cascade connection of a discrete multitone (DMT) modulator MOD 22 and a line interface TI 24. In addition, pilot tone identifying means TPT 26 are included and have an output coupled to an additional input of the DMT modulator MOD 22.

The receiving port RX 30 of the second ADSL modem contains between a signal input S' 35 and a data output DATA' 37 the cascade connection of a line interface RI 32 and a discrete multitone (DMT) demodulator DMOD 34. In addition, pilot tone identifying means RPT 36 are included and have an output coupled to an additional input of the DMT demodulator DMOD 34.

In FIG. 1, an embodiment of the transmission system according to the present invention is thus drawn in terms of functional blocks: TX, RX, TM, MOD, TI, TPT, RI, DMOD and RPT. The working of each of these blocks will be described sufficiently detailed in the following paragraphs. From this functional description, it will be obvious for a person skilled in the art of designing telecommunication devices how embodiments of these blocks can be manufactured with well-known electronic components. A detailed architecture of the contents of the functional blocks drawn in FIG. 1 hence is not given here.

In the transmitting part TX of the first ADSL modem, data DATA are applied to a data input DATA of the modulator MOD to be modulated thereby on a set of carriers. It is noticed that in FIG. 1, the some reference DATA is used for the incoming data and the terminal of the modulator MOD where the data are applied to. Furthermore it is remarked that the applied data DATA may be user data received from the outside world as well as overhead data, for instance bit allocation information generated inside the first ADSL modem. The modulator MOD then performs bit allocation, i.e. the modulator MOD allocates a certain number of data bits to each one of the carriers, selects an appropriate modulation type for each one of the carriers so that the right amount of bits can be modulated thereon, and then modulates the carriers. The carriers are transformed from frequency to time domain by the modulator MOD and extended cyclically so as to minimise intersymbol interference effects due to transmission over the telephone line TM. The so obtained symbols, called discrete multitone symbols, contain one carrier which is assigned to be pilot carrier and which will be used at the receiver's side for synchronisation. The modulator MOD modulates this pilot carrier in an alternating way. This means that, when 2 bits can be modulated on the pilot carrier via 4 QAM modulation, 4 different states are transmitted in an alternating way. The 4 states of the 4 QAM modulation technique are drawn in FIG. 2 and represented there by S1, S2, S3 and S4. Each of these states corresponds to a sine wave signal on the transmission line TM, and has its particular phase and amplitude. The frequency of this sine wave signal is defined by the pilot tone information means TPT. The pilot tone information means TPT may for example be a simple register containing on indication of the fixed frequency of the pilot tone, or alternatively, may be a device negotiating with the pilot tone information means RPT in the second modem which frequency will be reserved for the pilot tone. Modulating the pilot carrier in an alternating way implies that in successive DMT symbols, the pilot carrier is represented by sine waves S1, S2, S3, S4, S1, S2, . . . , and so on, or by another (predefined) sequence that visits all states in an alternating way. This is different from what is specified in the draft ADSL standard. Therein, the pilot carrier should be modulated with a constant signal, e.g. (0,0) which may be represented by the point in the first quadrant of the earlier mentioned vector plane in case of 4 QAM modulation. This means that on ADSL modem, operating according to the ADSL standard, transmits one single sine, S1 for instance, in successive DMT symbols as the pilot carrier.

Figure 2:
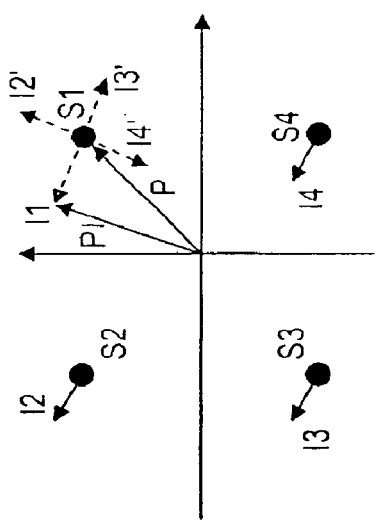
FIG. 2 represents a constellation scheme for modulating a pilot carrier in a particular embodiment of the present invention, and illustrates the influence of interference induced on the modulated pilot carrier.

In FIG. 2 it is supposed that a radio amateur signal affects the pilot tone carrier in the above described embodiment according to the present invention The interference component added to the states S1, S2, S3 and S4 in successive DMT symbols is I1, I2, I3 and I4 respectively. Instead of a sine wave whose amplitude and phase is determined by the vector P in FIG. 2, the receiver RX thus receives a sine wave whose amplitude and phase correspond to that of PI. Similarly, the sine wave received by the receiver RX in symbols wherein states S2, S3, or S4 are transmitted, differs in phase and amplitude from the transmitted sine wave in an amount determined by the respective vectors I2, I3 and I4.

The affected signal S' enters the receiving part RX of the central office modem and is applied to the line interface RI to be conditioned: transmission line coupling, frontend filtering and analogue to digital conversion for instance are performed with the appropriate levels of linearity and noise in RI. The conditioned and digitised signal then is applied to the demodulator DMOD which equalises the signal in time domain to compensate for intersymbol interference, which removes the cyclic prefix, converts the time domain signal into a frequency domain signal via fast fourier transformation and equalises the signal in frequency domain to compensate for phase and amplitude errors in the received carriers. The demodulator DMOD also regenerates the pilot carrier from the successive states S1, S2, S3, S4. The demodulation thereto leaves S1 unaffected, rotates S2 in the next DMT symbol over 90 degrees clockwise, rotates S3 in the next DMT symbol over 180 degrees clockwise, rotates S4 in the next DMT symbol over 270 degrees clockwise, and so on. All states are thus rotated to the first quadrant so that a continuous pilot carrier at the frequency indicated by the pilot frequency indicating means RPT is constituted. Due to the interference I1, I2, I3 and I4 induced on S1, S2, S3 and S4 respectively, the sine wave in successive DMT symbols representing the pilot carrier, differs in phase and amplitude from the originally transmitted phase and amplitude determined by the vector P. When turned back to the first quadrant, the phase and amplitude of the sine waves received in successive DMT symbols is given by the vectors P+I1, P+I2', P+I3' and P+I4'. As is seen from FIG. 2, the interference component induced on S1, i.e. I1, compensates for the interference effect I3' for the interference effect I4' induced on S4. Regenerating the pilot carrier in the demodulation DMOD and averaging over successive DMT symbols thus reduces the effect of the interference, if the pilot carrier is transmitted over the transmission line TM as a sequence of alternating modulation states. Theoretically, the pilot carrier can be regenerated perfectly so that synchronisation between the transmitter TX and receiver RX is not disturbed by the radio amateur. As a consequence, the data DATA' can be retrieved by demodulation of the other carriers in a perfect way.

A first remark is that, although the signal S in the above described embodiment is transported over a telephone line TM, the applicability of the present invention is not restricted by the transmission medium via which the signal S is transported. In particular, any connection between the transmitter TX and receiver RX, e.g. a cable connection, a satellite connection, a radio link through the air, and so on, may be affected by norrowbanded interference, and thus can be protected by the method according to the present invention. The invention also is not only related to ADSL (Asymmetric Digital Subscriber Line) or similar systems wherein DMT (Discrete Multi Tone) modulation is used. A person skilled in the art will be able to adapt the above described embodiment so that it is applicable to any other system wherein a pilot carrier is transmitted from transmitter TX to receiver RX for synchronisation purposes. U.S. Pat. No. 5,546,190 for instance describes an optical communication system wherein a pilot tone is multiplexed with multiple subcarriers, having frequencies which are integer multiples of the pilot tone frequency, and U.S. Pat. No. 5,548,344 describes an HDTV system wherein a pilot sine wave signal is multiplexed with the HDTV carriers.

Another remark is that the origin of the narrowbanded interference is of no importance for applicability of the present invention. Whether the disturbing signals are transmitted by a radio amateur, as supposed in the above described example, by a taxi, by the police, or are originating from yet another source is not relevant. Whenever the transmitter TX expects that the pilot carrier may be affected by an interferer, he can protect the synchronisation between transmitter TX and receiver RX by modulating the pilot carrier.

It is noticed that in an alternative embodiment, the pilot tone is modulated randomly instead of in an alternating way. This means that, referring to FIG. 2, a random sequence of the states S1, S2, S3 and S4 is transmitted instead of a predetermined alternating sequence.

In yet another alternative embodiment, the pilot carrier may be modulated with scrambled data. Scrambling part of the data DATA in FIG. 1 has a randomising effect. Such randomised data then may be modulated on the pilot carrier. Since the states S1, S2, S3 and S4 will randomly be transmitted, demodulation in the receiver and averaging will again reduce the effect of the induced interference. Apparently, the latter embodiment has the advantage of an increased capacity, since the bandwidth occupied by the pilot carrier also is used for transmission of data. In case of ADSL transmission, overhead information such as the aoc-data or eoc-data may be used to modulate the pilot carrier.

While the principles of the invention have been described above in connection with specific apparatus, it is to be clearly understood that this description is made only by way of example and not as a limitation on the scope of the invention.

What is claimed is:

1. A method for transmitting user data elements from a Digital Subscriber Line (DSL) transmitter to a Digital Subscriber Line receiver, wherein
   a. said user data elements modulate at least one carrier;
   b. a pilot carrier used for synchronisation between said DSL transmitter and said DSL receiver is multiplexed with said at least one carrier;
   c. said at least one carrier and said pilot carrier are transmitted over a transmission medium interconnecting said DSL transmitter and said DSL receiver,
characterized in that said pilot carrier is modulated with part of said user data elements for enlarging effective bandwidth for transport of said user data elements.

2. A method of claim 1 further characterized in that said user data elements are scrambled before modulating said at least one carrier and said pilot carrier therewith for increasing the random nature of said user data elements.

3. A Digital Subscriber Line (DSL) transmitter, adapted to transmit user data elements to a Digital Subscriber Line receiver via a transmission medium, said DSL transmitter comprising:
   a. a Discrete Multi Tone (DMT) modulator to an input of which said user data elements are applied, said DMT modulator being adapted to modulate said user data elements on at least one carrier, and to multiplex said at least one carrier with a pilot carrier used for synchronisation between said DSL transmitter and said DSL receiver; and
   b. a line interface, coupled between an output of said DMT modulator and an input of said transmission medium, and adapted to condition said at least one carrier and said pilot carrier to be transmitted over said transmission medium,
characterized in that said DMT modulator is further adapted to modulate said pilot carrier with part of said user data elements for enlarging effective bandwidth for transport of said user data elements.

4. A Digital Subscriber Line (DSL) transmitter according to claim 3, further characterised in that said DSL transmitter comprises a scrambler adapted to scramble said user data elements for increasing the random nature thereof, and to apply the scrambled user data elements to said DMT modulator.

5. A Digital Subscriber Line (DSL) transmitter according to claim 3, further characterized in that said DSL transmitter is an Asymmetric Digital Subscriber Line (ADSL) transmitter.

6. A Digital Subscriber Line (DSL) transmitter according to claim 3, further characterized in that said DSL transmitter is a Very High Speed Digital Subscriber Line (VDSL) transmitter.

7. A Digital Subscriber Line (DSL) receiver, adapted to receive user data elements transmitted thereto by a Digital Subscriber Line transmitter via a transmission medium, said DSL receiver comprising:
   a. a line interface, coupled to an output of said transmission medium and adapted to condition a signal transferred over said transmission medium to be applied to components of said DSL receiver; and
   b. a Discrete Multi Tone (DMT) demodulater, an input of which is coupled to an output of said line interface, said DMT demodulator being adapted to demultiplex in said signal a pilot carrier from at least one further carrier, to demodulate a first part of said user data elements from said at least one further carrier, to demodulate a second part of said user data elements from said pilot carrier and to use the demodulated pilot carrier for synchronisation, said pilot carrier enlarging effective bandwidth for transport of said user data elements.

8. A Digital Subscriber Line (DSL) receiver according to claim 7, characterized in that said DSL receiver is an Asymmetric Digital Subscriber Line (ADSL) receiver.

9. A Digital Subscriber Line (DSL) receiver according to claim 7, charaterized in that said DSL receiver is a Very High Speed Digital Subscriber Line (VDSL) receiver.

* * * * *